United States Patent
Bueti et al.

(10) Patent No.: US 8,347,019 B2
(45) Date of Patent: Jan. 1, 2013

(54) STRUCTURE FOR HARDWARE ASSISTED BUS STATE TRANSITION CIRCUIT USING CONTENT ADDRESSABLE MEMORIES

(75) Inventors: Serafino Bueti, Waterbury, VT (US); Kenneth Joseph Goodnow, Essex Junction, VT (US); Todd Edwin Leonard, Williston, VT (US); Gregory John Mann, Wheaton, IL (US); Jason Michael Norman, Essex Junction, VT (US); Clarence Rosser Ogilvie, Huntington, VT (US); Peter Anthony Sandon, Essex Junction, VT (US); Charles S. Woodruff, Charlotte, VT (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 12/122,321

(22) Filed: May 16, 2008

(65) Prior Publication Data
US 2008/0282015 A1 Nov. 13, 2008

Related U.S. Application Data

(63) Continuation-in-part of application No. 11/627,588, filed on Jan. 26, 2007, now abandoned.

(51) Int. Cl.
*G06F 3/00* (2006.01)
*G06F 13/00* (2006.01)

(52) U.S. Cl. ........ 710/316; 710/305; 710/104; 711/104; 365/49.17

(58) Field of Classification Search ................... 710/313, 710/316, 104, 305; 711/108; 365/49.17
See application file for complete search history.

(56) References Cited

U.S. PATENT DOCUMENTS

| | | | |
|---|---|---|---|
| 5,655,102 A * | 8/1997 | Galles | 711/150 |
| 6,209,067 B1 * | 3/2001 | Collins et al. | 711/158 |
| 6,362,990 B1 * | 3/2002 | Gibson et al. | 365/49.1 |
| 6,510,229 B1 | 1/2003 | Geile | |
| 6,606,317 B1 * | 8/2003 | Beadle et al. | 370/390 |
| 6,799,246 B1 | 9/2004 | Wise et al. | |
| 7,143,218 B1 * | 11/2006 | Yin et al. | 710/107 |
| 7,173,452 B2 * | 2/2007 | Folsom | 326/46 |
| 7,330,924 B1 * | 2/2008 | Kao et al. | 710/305 |
| 7,484,022 B1 * | 1/2009 | Yin et al. | 710/104 |
| 7,644,080 B2 * | 1/2010 | Mammen et al. | 707/713 |
| 2004/0054848 A1 * | 3/2004 | Folsom | 711/108 |

* cited by examiner

*Primary Examiner* — Ernest Unelus
(74) *Attorney, Agent, or Firm* — Scully, Scott, Murphy & Presser, P.C.; Michael J. LeStrange, Esq.

(57) ABSTRACT

A design structure including universal peripheral processor architecture on an integrated circuit (IC) includes a first data bus and a second data bus communicating with first and second ternary content addressable memory (TCAM) devices configured as state machines. First and second processors are coupled to the first bus interface logic and the second bus interface logic. First and second data storage devices communicate with the first and second processors and are coupled to the first and second data buses and communicate with each other. The TCAM devices are configured as state machines and are coupled to and adapted to interface with the processors, the data storage devices, and the bus interface logic using predefined protocols.

25 Claims, 4 Drawing Sheets

STRUCTURE FOR HARDWARE ASSISTED BUS STATE TRANSITION CIRCUIT USING CONTENT ADDRESSABLE MEMORIES

CROSS-REFERENCE TO RELATED APPLICATION

This application is a continuation-in-part of co-pending and co-assigned U.S. patent application Ser. No. 11/627,588, filed Jan. 26, 2007, currently pending.

FIELD OF THE INVENTION

The invention relates to a design structure including universal processor architecture on an integrated circuit, and more particularly, to a design structure for a configurable finite state machine (TCAM) as an interface between a processor and a plurality of data bus elements having multiple protocols.

BACKGROUND OF THE INVENTION

Microprocessors (μp) using miniaturized transistors on a semiconductor integrated circuit (IC) may use a state machine or finite state machine (FSM) in the design of their hardware digital system. Microprocessors may also use a programmable state machine.

For example, U.S. Pat. No. 6,799,246 to Wise, et al. discloses a hardware system for receiving data from a memory bus and storing it into a memory array. The memory data can be translated to reside in a different part of the memory array than its associated bus address. This allows flexibility in the storage of the data as well as manipulation of the data by the memory array. A ternary content addressable memory device (TCAM) is used to provide an index of where the data resides from the external memory bus address. A memory hardware assist for memory arrays and data movement with the peripheral bus control signals is disclosed.

Processor systems for system-on-chip (SOC) environments on an Integrated Circuit may use a software based architecture for a generic peripheral processor. However, in practice, the usefulness of this architecture may be limited by protocol requirements of multiple buses. For example, if the protocol of the bus requires responses from a microcontroller (MCU or uController) within a single cycle, the uController may not have the bandwidth to meet the specified response time.

A core IP library is a library of logic designs implementing different functions (e.g.: PCI Core, UART Core, SRAM Core). A core IP library contains a multitude of unique designs that are costly to design, maintain, and migrate from technology to technology nodes. However, the core IP library is needed in the application-specific integrated circuit (ASIC) integrated circuit design function.

Bus adapters between high-speed interfaces are typically implemented using dedicated circuits, for example, within an ASIC. If a flaw is discovered within this dedicated circuit or an interface protocol changes, the ASIC must be redesigned and manufactured at an expense, and significant impact on the length of time it takes for a product to be available for sale (time-to-market).

Peripheral processors or microcontrollers provide the processing necessary to translate one bus standard to another. These processors typically are not the main processors of a system, but are dedicated to handling interface translations. Using these peripheral processors, certain peripheral cores or microcontrollers are replaceable which previously were built with dedicated circuits. Peripheral cores typically use dedicated circuits for performance and size reasons. Bus protocols require state-tracking, and only dedicated circuits could previously handle the performance requirements. However, with technology improvements in the area of performance and size, more general purpose solutions can be reasonably applied.

When using a generic microprocessor to replace a peripheral core, processor, or microcontroller, the variety of protocols which can be supported will depend, among other things, on the performance of the microprocessor. Within a given technology node, this microprocessor can dedicate some maximum number of cycles to analyzing and responding to various states of the peripheral interface. For complex or fast interfaces, this number of cycles may not be sufficient.

It would therefore be desirable to reduce the resulting expense and impact on design, manufacturing and time when an error is found on a dedicated circuit, or when implementing interface protocol changes. It would also be desirable to provide a means for eliminating the need to redesign and manufacture an ASIC when a flaw is discovered, or when implementing interface protocol changes. Further, it would also be desirable for software architecture to provide for controlling multiple protocols on buses.

SUMMARY OF THE INVENTION

The invention relates to a universal peripheral processor architecture on an integrated circuit (IC) which comprises a first data bus and a second data bus. The first and second data buses are coupled to a ternary content addressable memory (TCAM) interface logic device and a processor is coupled to the TCAM. The TCAM enables communication between the first and second data buses. A data path enables transfer of data between the first and second data buses, and the data path also communicates with a data storage device. A data control path enables communication between and is coupled to the data storage device, the processor, and the TCAM. The data storage device may include a FIFO device. The first and second TCAMs are coupled to the first and second buses, respectively, and first and second processors may be coupled to the first and second TCAMs, while first and second data storage devices may both communicate with the data path.

In another aspect according to the invention a universal peripheral processor architecture on an integrated circuit (IC) comprises a first data bus and a second data bus. The first data bus is coupled to a first TCAM and the second data bus is coupled to a second TCAM for enabling communication between the first and second buses including enabling interface of multiple signaling protocols. A processor for managing control functions on the IC is coupled to the first TCAM and the second TCAM by a data path, such that the data path communicates with a first storage device coupled to a second storage device. A data control path enabling communication between and is coupled to the first and second data storage devices, the processor, and the first and the second TCAMs.

In a related aspect of the invention, the TCAMs are adapted to interface between the processors using a predefined protocol.

In a related aspect of the invention, a plurality of TCAMs communicate with each other and a plurality of processors.

In a related aspect of the invention, a plurality of FIFOs communicate with the first and second data buses.

In a related aspect of the invention at least two clock domains and a plurality of metastability devices communicate with the processors to provide interface between the clock domains and the processors.

In another aspect according to the invention a universal peripheral processor architecture on an integrated circuit (IC) comprises a first data bus and a second data bus communicating with a first ternary content addressable memory (first TCAM) and a second ternary content addressable memory (second TCAM), such that the first and second TCAMs enable communication between the first and second data buses including enabling interface of multiple signaling protocols. A first processor for managing control functions on the IC is coupled to the first TCAM, and a second processor is coupled to the second TCAM. A first data storage device communicates with the first processor and a second data storage device communicates with the second processor. Both the first and the second data storage devices are coupled to the first data bus and the second data bus and communicate with each other. A data control path enabling communication between and is coupled to the first and second data storage devices, the first and second processors, and the first and second TCAMs. The first TCAM is configured as a state machine and coupled to the first data storage device. The first TCAM is adapted to interface between the first processor and the first data bus using a first predefined protocol. The second TCAM configured as a state machine and coupled to the second data storage device. The second TCAM is adapted to interface between the second processor and the second data bus using a second predefined protocol.

In a related aspect of the invention the first data bus and first TCAM are in a first clock domain and the second data bus and the second TCAM are in a second clock domain. Further, at least one meta-stability device communicates with and provides interface between the first and second data buses and the first and second processors.

In a related aspect of the invention the first and second data storage devices include first and second FIFO devices, respectively.

In a related aspect of the invention first and second transformers provide data transformation between the first and second data buses, respectively. Further, the first and second transformers communicate with the first and second data storage device, respectively, via a plurality of data paths and communicate with the first and second processors, respectively, via a plurality of control paths.

In a related aspect of the invention the first and second data buses communicate with each other and the first and second storage devices via a plurality of data paths.

In another aspect according to the invention, a method enables a peripheral processor on an IC to provide an interface between multiple data buses and comprises providing a first data bus and a second data bus wherein the first data bus is coupled to a first TCAM interface logic device and the second data bus is coupled to a second TCAM interface logic device for enabling communication between the first and second data buses. A processor for managing control functions is provided which is coupled to the first TCAM and the second TCAM. A data path enabling transfer of data between a first data storage device is coupled to a second data storage device. The method further provides a first control path enabling communication between and coupled to the first data storage device, and a second control path enabling communication between and coupled to the second data storage device. Data is received from the processor to at least one of the first or second TCAMs to provide interface between the processor and the first and second data buses using a predefined protocol. The first and second TCAMs may be configured as state machines.

In a related aspect of the invention, a first processor and a second processor are coupled to the first TCAM and the second TCAM. The first TCAM receives data from the first processor and the second TCAM receiving data from the second processor.

In another aspect of the invention, a design structure includes universal peripheral processor architecture embodied in a machine readable medium for designing, manufacturing, or testing an integrated circuit (IC). The design structure comprises a first data bus and a second data bus wherein the first and second data buses are coupled to a TCAM (ternary content addressable memory) device for enabling communication between the first and second data buses. The design structure further includes a processor for managing control functions on the IC being coupled to the TCAM device, and a data path enabling transfer of data between the first and second data buses, wherein the data path also communicates with a data storage device. The design structure includes a data control path enabling communication between and coupled to the data storage device, the processor, and the TCAM device.

In a related aspect, the design structure includes a FIFO device. The design structure may further comprise first and second processors coupled to the first TCAM and the second TCAM; and comprise first and second data storage devices both communicating with the data path. The design structure may comprise a netlist, or may reside on storage medium as a data format used for the exchange of layout data of integrated circuits, or may reside on a programmable gate array.

In another aspect of the invention, a design structure including universal peripheral processor architecture embodied in a machine readable medium for designing, manufacturing, or testing an integrated circuit (IC). The design structure comprises a first data bus and a second data bus wherein the first data bus is coupled to a first TCAM interface logic device configured as a state machine and the second data bus is coupled to a second TCAM interface logic device configured as a state machine. The first and second TCAMs enable communication between the first and second data buses including enabling interface of multiple signaling protocols. A processor manages control functions on the IC being coupled to the first TCAM and the second TCAM by a data path, wherein the data path communicates with a first data storage device coupled to a second data storage device. A data control path enables communication between and coupled to the first and second data storage devices, the processor, and the first and second TCAM interface logic devices, and the first and second TCAMs are adapted to interface between the processors using a predefined protocol.

In a related aspect, the design structure further includes a plurality of TCAMs communicating with each other and a plurality of processors. The design structure may further include a plurality of FIFOs communicating with the first and second data buses. The design structure may further include at least two clock domains and a plurality of meta-stability devices communicating with the processors to provide interface between the clock domains and the processors. The design structure may also comprise a netlist, and the design structure may reside on storage medium as a data format used for the exchange of layout data of integrated circuits, or the design structure may reside on a programmable gate array.

In another aspect of the invention, a design structure includes universal peripheral processor architecture embodied in a machine readable medium for designing, manufacturing, or testing an integrated circuit (IC). The design structure comprises a first data bus and a second data bus communicating with a first ternary content addressable memory (first TCAM) and a second ternary content addressable memory (second TCAM), wherein the first and second interface logic devices enable communication between the first and second data buses including enabling interface of multiple signaling protocols. The design structure further includes a first processor for managing control functions on the IC being coupled to the first TCAM, and a second processor for managing control functions on the IC being coupled to the second TCAM. A first data storage device communicates with the first processor and a second data storage device communicates with the second processor. Both the first and the second data storage devices are coupled to the first data bus and the second data bus and communicate with each other. A data control path enables communication between and is coupled to the first and second data storage devices, the first and second processors, and the first and second TCAMs. The first TCAM configured as a state machine and coupled to the first data storage device, and the first TCAM adapted to interface between the first processor and the first data bus using a first predefined protocol. The second TCAM configured as a state machine and coupled to the second data storage device, and the second TCAM adapted to interface between the second processor and the second data bus using a second predefined protocol.

In a related aspect, the first data bus and first TCAM are in a first clock domain and the second data bus and the second TCAM are in a second clock domain, and at least one metastability device communicates with and provides interface between the first and second data buses and the first and second processors. The first and second data storage devices may include first and second FIFO devices, respectively. The design structure may further include first and second transformers to provide data transformation between the first and second data buses, respectively, wherein the first and second transformers communicate with the first and second data storage device, respectively, via a plurality of data paths and communicate with the first and second processors, respectively, via a plurality of control paths. The first and second data buses may communicate with each other and the first and second storage devices via a plurality of data paths. The design structure may comprise a netlist. The design structure may reside on storage medium as a data format used for the exchange of layout data of integrated circuits, or the design structure may reside on a programmable gate array.

DETAILED DESCRIPTION OF THE INVENTION

The present invention provides a re-programmable finite state machine for use in a universal peripheral processor architecture. The re-programmable finite state machine (FSM) can implement changes if a flaw is found in the state machine, or an interface protocol changes. A ternary content-addressable memory (TCAM) provides a mechanism to implement a high-performance finite state-machine. The FSM can handle the interface signaling protocol, while processors handle the remaining control functions. Typically, a signal can be a single wire carrying a digital signal which may be assigned a meaning such as "start-transfer", "request-bus", "grant-bus", etc. A signaling protocol is the defined sequence of events and interactions among the different signals which must be followed to effect some transaction. For example, a device on one side of a bus may want to write data, and thus asserts a request-signal. The receiving element might assert a grant-bus. The sending device then could assert a start-transfer, and then begin sending the data on a data bus.

All of these events might need to happen within a few cycles of one another. A FSM is able to follow the protocol rules, where a processor might not have the bandwidth. In this example, the processor would issue the write command (this is a control function) to the FSM within the TCAM, and the TCAM would be responsible for asserting and responding to the individual signals within the required time to compose the write transaction.

Figure 1:
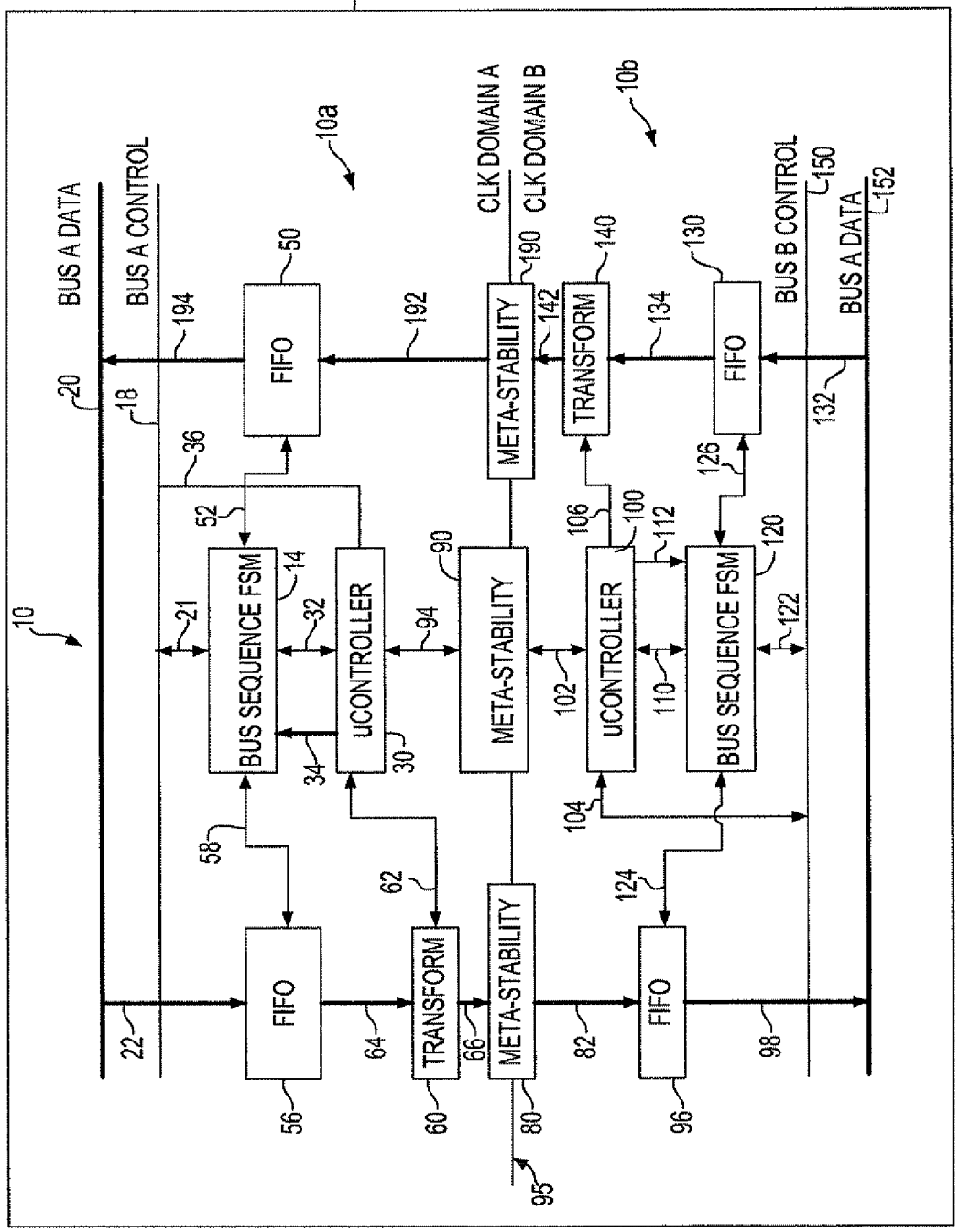
FIG. 1 is a block diagram of a general purpose bus interface sequencing finite state machine (FSM) according to an embodiment of the invention.

Generally, according to the present invention, as exemplified in FIG. 1, a microprocessor or microcontroller 30, 100 uses programmable finite state machines 14, 120 (as interface logic devices) to implement interface features for multiple data buses 20, 152. The present invention uses a (ternary content-addressable memory) TCAM to build a finite-state machine 14, 120. Further, the present invention provides a programmable finite state machine 14, 120 which may be used to interface between multiple buses 20, 152. The invention is also directed to local bus and TCAM interaction. The invention accesses an external peripheral bus and controls the work associated with the peripheral bus control signals.

An exemplary embodiment of the present invention is shown in FIG. 1 and includes a universal processor architecture comprising a first data bus 20 and a second data bus 152 whereby a dataflow path from the first bus to the second bus is initiated by a series of signal interactions which may be initiated, for example, by a device on one side of a bus which may want to write data. The system includes two configurable finite state machines 14, 120 interfacing between the processors 30, 100 and control buses 18, 150 for respective data buses 20, 152. The FSMs 14, 120 use ternary content addressable memory devices (TCAMs) to provide the interface between the processors 30, 100 and the control buses 18, 150. This invention extends the architecture of a generic peripheral processor to provide configurable finite state machines 14, 100 (interface logic devices) which can handle low level protocol requirements. An embodiment of the present invention uses a software based approach by providing a flexible FSM architecture based on ternary content-addressable memory (TCAM).

In general, this invention describes a general purpose finite-state machine (FSM), which can offload low-level protocol handling from a microprocessor, thereby expanding the number of interfaces supported by this microprocessor based architecture. The main element of this finite-state machine architecture is a ternary content-addressable memory (TCAM). The ternary CAM (TCAM) allows pattern matching, which is matching a particular state of a group of signals, with the use of "don't care" (X's) states. The don't care states act as wild cards during a search.

A universal peripheral processor according to the present invention includes a TCAM. The TCAM is fully configurable and can match wide input patterns and the "X" (don't care) states. In implementing the TCAM, the number of branches in the state-machine is limited to the total number of TCAM entries. The contents of the TCAM can be modified, thus, the definition of the FSM can be dynamically reprogrammed. The default states can easily define trap error states. A default trap state can be programmed into the TCAM such that an input which does not match any valid state will match a tag of the trap state. For example, if the TCAM is programmed such that the lowest priority entry (last entry considered for a match) defined all inputs as don't cares, then that entry would always result in a match given that none of the higher priority entries matched. The FSM communicates state information to the microprocessor via a hardware branch vector. The hardware branch vector allows the execution thread to define points at which it will act on the current state of the FSM.

Further, the universal peripheral processor of the present invention includes the use of a configurable FSM as an interface between a peripheral processor and a bus element. The universal peripheral processor uses a TCAM to build a configurable FSM which provides a hardware branch vector to a microprocessor. The FSM according to the present invention is dynamically reconfigurable to handle various phases of an interface protocol.

Referring to FIG. 1, an embodiment of a general purpose bus interface sequencing FSM circuit 10 is shown on a integrated circuit (IC or chip) 350. The FSM circuit 10 is divided along dividing line 95 into clock domain A 10a and clock domain B 10b. The FSM circuit 10 includes meta-stability devices 80, 90, and 190 positioned along dividing line 95. The meta-stability devices 80, 90, and 190 communicate with the processors to provide interface between the clock domains and the processors. The data along bus A data path 20 travels in clock domain A 10a towards clock domain B 10b via data paths 22, 64, and 66. Within clock domain B 10b, the data path continues via data paths 82 and 98 whereupon data path 98 connects with bus B data path 152. The data travels along bus B in the direction toward clock domain A 10a via data paths 132, and 134 whereupon the data path 142 connects with the meta-stability device 190. The FIFO 50 in clock domain A 10a is connected to meta-stability device 190 via data path 192. The data path 194, returns to bus A data path 20. In general, FIFO refers to, first-in, first-out, which is an approach to handling program work requests from queues or stacks so that the oldest request is handled next.

The circuit 10 (shown in FIG. 1) includes a bus sequence FSM 14 connected to bus A control line 18 via control path 21. The FSM 14 is designed as a TCAM. A microcontroller 30 communicates with the FSM 14 via control path 32 and communicates with the TCAM FSM 14 via data path 34. The micro controller 30 further communicates directly with the bus A control line 18 via control path 36 and a transform device 60 via control path 62. The transform device 60 performs data transformations between BUS A 20 and Bus B 152. The FSM communicates with both FIFOs 50 and 56 via control paths 52 and 58, respectively. The micro controller 30 communicates with the meta-stability device 90 via control path 94. The transform device 60 is connected to meta-stability device 80 via data path 66 which is in turn connected to the FIFO 96 via data path 82.

Further referring to FIG. 1, the micro controller 100 is connected to the meta-stability device 90 via control path 102 and to a bus sequence TCAM FSM 120 via control path 110. The microcontroller 100 also is connected directly to the bus B control line 150 via control path 104 and to transform device 140 via control path 106. Similar to transform device 60, transform device 140 performs data transformations between Bus A 20 and Bus B 152. For example, Bus A 20 may be configured for communicating 32-bit wide data portions and Bus B 152 may communicated 8-bit wide data portions. In this example, a transfer from Bus A to Bus B would require a split of the 32-bit wide data portions into four 8-bit wide data portions. Similarly, a transfer from Bus B to Bus A would require gathering four 8-bit data pieces into one 32-bit piece. Further, the transform devices 60, 140 may re-order bytes according to the byte-ordering rules of each bus's specification. The transform devices 60, 140 allow the Bus Sequence FSMs 14, 120 to manage the control portion of the bus protocols, whereas the transform devices 60, 140 manage the data-formatting aspects of the bus protocols implemented.

As shown in FIG. 1, the FIFO 96 is connected to the bus B data path 152 via data path 98. The bus sequence TCAM FSM 120 is connected to the micro controller 100 via control path 110 and connected to the bus B control logic 150 via control path 122. The TCAM FSM 120 is connected to FIFO 130 via control path 126, and the micro controller 100 via data path 112. The bus B data 152 is connected to FIFO 130 via control path 132. The FIFO 130 is connected to the transform circuit 140 via control path 134. The transform 140 is connected to the meta-stability device 190 via control path 142. FIFO 50 is connected to the meta-stability device 190 via data path 192 and to the bus A data path via data path 194.

The Bus Sequence FSMs 14, 120 monitor the Bus A control logic 18 and Bus B control logic 150, respectively, and can offload signal-level protocol from the microprocessors 30, 100. In addition, the Bus Sequence FSMs 14, 120 can control the loading and unloading of the appropriate FIFOs from the data portion of the respective buses 20, 152. The microprocessors 30, 100 may load the contents of the TCAM FSMs 14, 120, respectively, within the Bus Sequence FSM over data paths 34, 112, respectively. Clock domain A 10a and clock domain B 10b may not be synchronous, and thus the meta-stability devices 80, 90, 190 provide appropriate clock domain interfaces.

Figure 2:
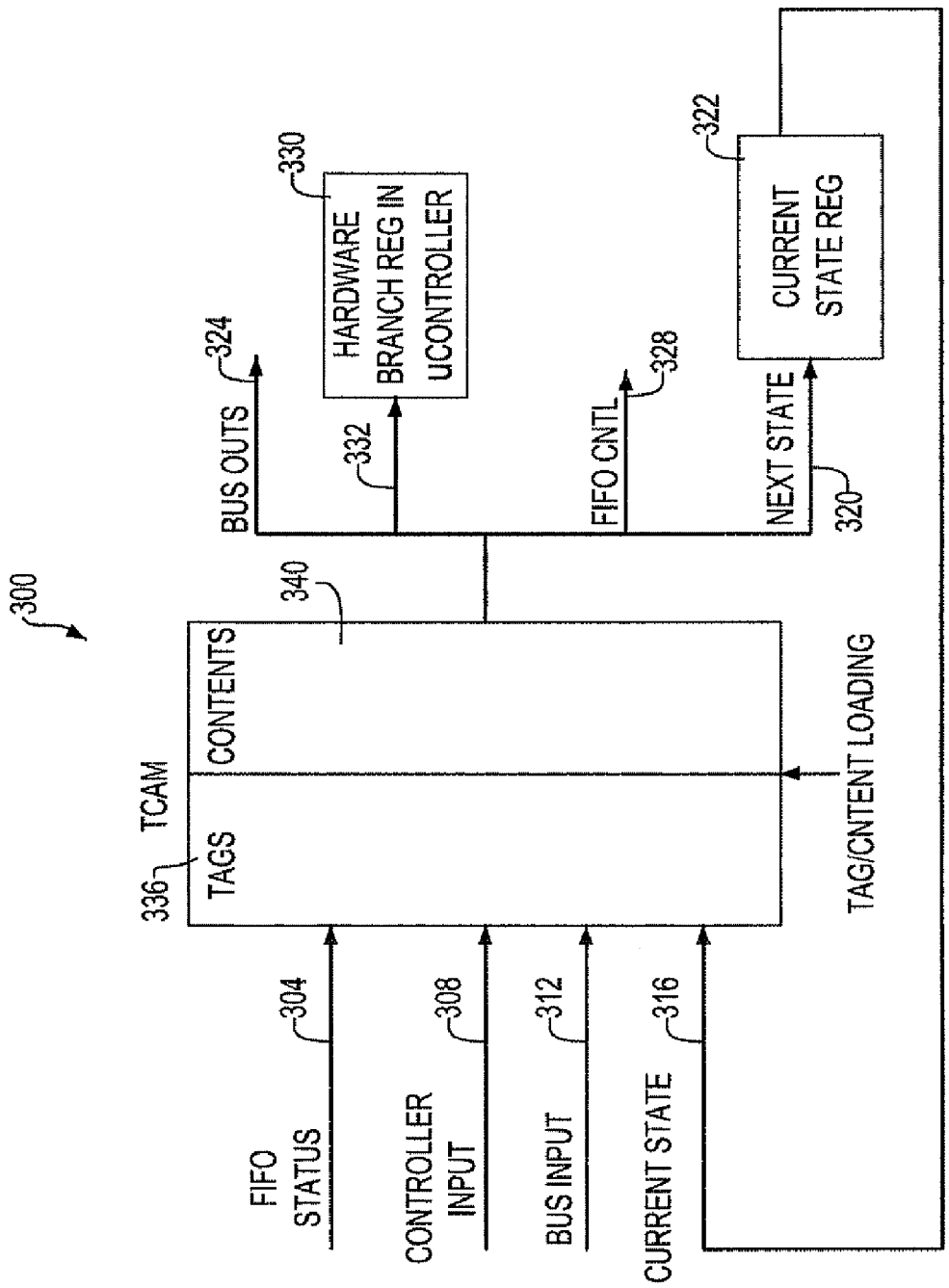
FIG. 2 is a block diagram of an exemplary TCAM device in the FSM shown in FIG. 1.

Referring to FIG. 2, an embodiment of a Bus Sequence FSM is built from a TCAM 300. The inputs to the TCAM 300, include a FIFO Status signal 304 (level of fullness), a signal from the microcontroller 308, a signal from the control portion of the peripheral bus 312, and the signals representing the current state of the FSM 316. According to the values of these inputs signals, the next state 320 and outputs 324 can be determined. Output signals from the TCAM 300 include: the next-state 320, drive signals 324 on the peripheral bus, FIFO control signal 328 (load/unload), and a branch vector 332 for receipt by a register 330 in the microprocessor. The microcontroller input 308 loads both the tag 336 and contents 340 of the TCAM 300. The tag 336 is associated with a specific memory location cell having contents 340. Since the IC 350 or microcontrollers 30, 100 (FIG. 1) can change the definition of this state-machine/TCAM 300 dynamically, the protocols may be changed for different phases of an interface definition (training, auto-sensing, sleep, etc).

The control of the FIFO (when to load/unload) and the status of the FIFO (full, empty, near-full, etc.) is communicated to/from the state machines 14, 120 via control paths 58, 52, 124, 126 (shown in FIG. 1). For example, referring to FIG. 1, if Bus A 20 was attempting to write data to Bus B 152, the state machine may enter a state of waiting for data arrival from Bus A 20. In this case, it would load the data into the FIFO 56 if there is room. If the FIFO 56 does not have room, the state machine 14 might transition to another state which asserts some wait signal onto Bus A. As shown in FIG. 2, the FIFO status 304 is one field of the inputs into the TCAM 300. FIFO control 328 is one field of the FSM outputs. The encodings of FIFO status and control signals will depend on the FIFO interface, which is not specified here.

Referring to FIGS. 3A and 3B, an example state diagram 400 and corresponding state table 600 are shown. The state diagram 400 and state table 600 reflect the possible state changes in an example TCAM. When designing a bus sequencing FSM to handle different protocols a state machine is needed to track various stages of the protocol. The TCAM enables a generalized building of the state machine. Using the state machine, the TCAM can be programmed to contain the next state as well as various controls. It is understood that a TCAM may be used to build any number of different types of state machines according to a specific protocol on a bus.

A particular finite-state machine transition is triggered by some combination of the FSM's inputs. The decision to take a particular transition path is based on some subset of the FSM inputs (including no inputs at all), in which case the remaining inputs are considered don't cares. A state machine built from a TCAM, can define which inputs are significant and which are don't-cares using the "mask" feature within the TCAM. In FIG. 3A, for example, the transition from state C 450 to D 550 will always happen independent of the state of the inputs (In=XXX). Thus, line 712 of the state machine table sets all bits of the mask, which means that none of the input bits will be considered in matching this row of the table.

In the state diagram 400 shown in FIG. 3A, there is depicted a state A 402 having values representing a current state of "00" 404, the bus out state is "00" 408, and the branch state is "00" 412. In the state chart 600, three rows 702, 704, 706 show the current state as "00" 404 which correspond to the state A 402. The next state column 616 in the state chart 600 is either "01", "10", or "00" corresponding to rows 702, 704, 706, respectively.

Figure 3:
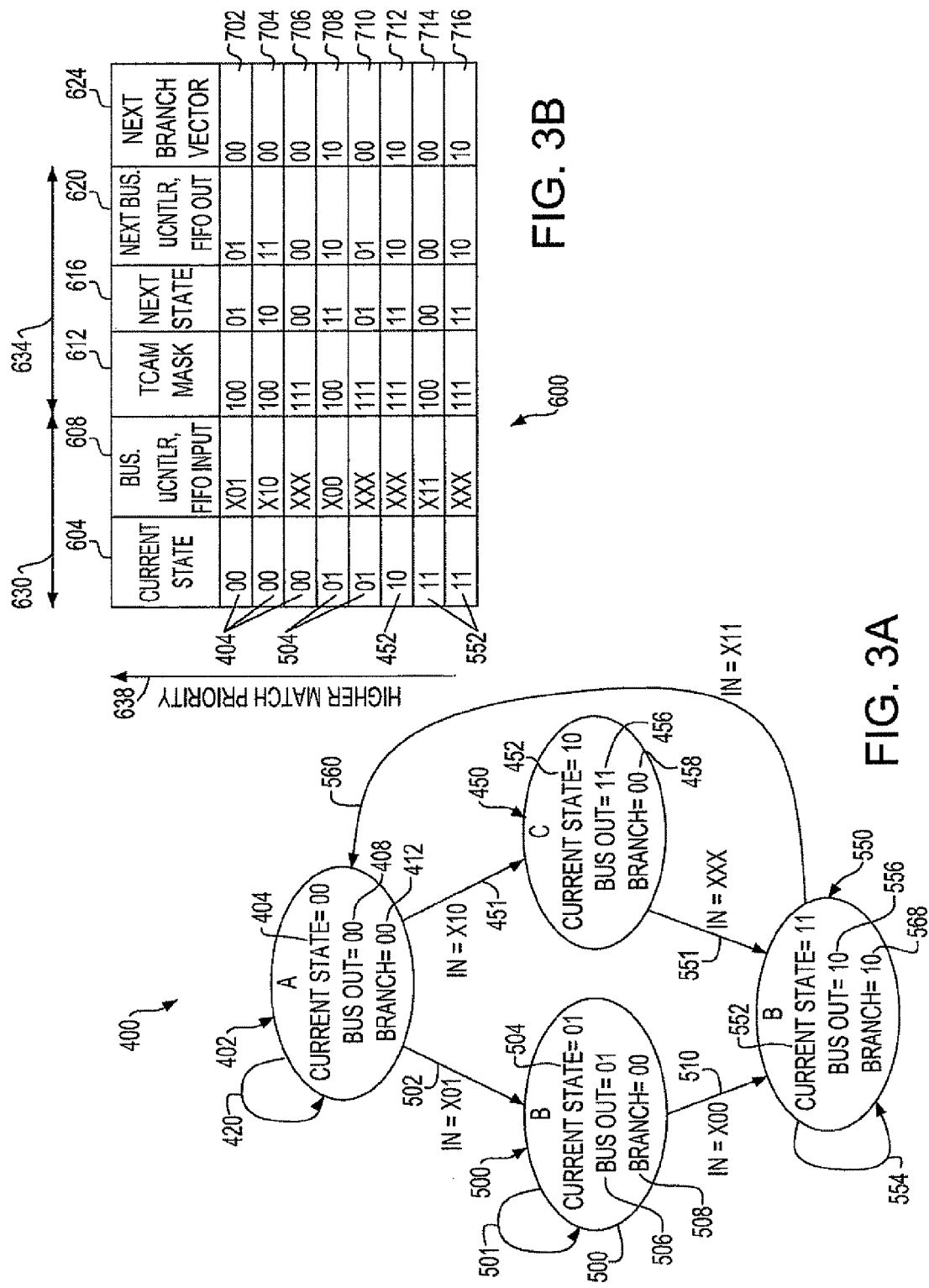
FIG. 3A is an exemplary state diagram for the FSM shown in FIG. 1.
FIG. 3B is a state table for the state diagram shown in FIG. 3A.

Referring to FIG. 3, as can be seen from the state diagram 400, the next state from state A 402 can be a return 420 to state "00" in state A 402 which corresponds to row 706, columns 616, 620, and 624, respectively, and specifically to bus out "00" 408, and branch "00" 412 in the state A 402. Also, the next state from A 402 can be to state C 450 where the current state is "10" 452 corresponding to row 704, column 616 where the next state is "10". The bus out state "11" and branch state "00" in C 450 correspond to columns 620, 624 in row 704, respectively, The FIFO input "X10" shown in column 608 for row 704 corresponds with the input 451 to state C 450 in the state diagram. Lastly, the next state from A 402 can be to current state "01" 504 as shown in B 500, with a bus out state "01" 506, and branch state of "00" 508, corresponding to row 702, columns 616, 620, and 624 in table 600, respectively. The FIFO input "X01" shown in column 608 for row 702 corresponds with the input 502 to state B 500 in the state diagram.

In the state diagram shown in FIG. 3B, a represented state C 450, the current state is "10" 452 which corresponds to row 712, column 604 in the state table 600. The next state is to D 550 where the current state is "11" which corresponds to rows 714 an 716, column 616 in the state table. The FIFO input shown in the state table 600, in row 712, column 608 is depicted in the state diagram as input "XXX" 551 into state 550. The next bus out state "10" 556, and the next branch state "10" 568 shown in state D 550 are correspondingly shown in the state table 600 in row 712 columns 620, and 624, respectively, along with the next state "11" show in column 616.

From state B 500, the current state is "01," which corresponds to rows 708 and 710 in the state table. The next state can be "11" following input "X00" along path 510 to state D 550 and is shown in the state table 600 at row 708, column 616. The next bus and next branch states in columns 620, and 624 show "10" and "10", respectively, in row 708, which correspond to the bus out and branch states in state D 550. The next state out of state 500 can also be "01" when following a return line 501 back to B 500, and as shown in the state table at row 710, column 616, with corresponding bus out state "01" 506 and branch state "00" 508 shown in columns 620 and 624, respectively.

From state D 550 the current state 552 is "11" which corresponds to row 714 in the state table. In the state table 600, row 714, column 616, the next state is "00". As shown by line 560 in the state diagram, the next state from state D 550 is returning to state A 402 having current state "00" 404. Also, the next state out of D 550 can be a return 554 to D which corresponds to row 716, column 616 in state table 600.

According to the invention, a TCAM may be programmed to implement any finite-state machine. The limitations for programming a finite state machine include the characteristics of the TCAM, e.g., the number of entries, tag size, etc. A TCAM is similar to a standard random access memory (RAM) because it stores information in an array of addressable memory elements. However, in RAM, an address is used to access that array and the address is implicitly associated with an element in the storage array according to the design of the RAM. In contrast, in a TCAM, this association between a memory element and the address or tag must be explicitly programmed, for example, into the tags portion 336 of the TCAM 300 shown in FIG. 2. The TCAM looks at the inputs, compares the inputs against the tag contents to decide which storage element content to access. The tags portion of the TCAM must be initialized before reading and writing can occur.

Further, a TCAM is advantageous for building general purpose finite-state machines because the Mask bits 612 (FIG. 3) may be considered part of the tag portion of the TCAM allowing bit fields of the input be ignored. The mask signifies which bits of the input are significant in trying to match the input against a tag. Another feature is that tags are searched in a specific order. It is possible to program tags such that multiple tags might match a given input, thus, the TCAM will always chose the highest priority match. For example, in FIG. 3, in the last line of the table (716), the TCAM Mask is set to all 1s, which means that all inputs will be ignored in trying to match inputs against tags. This has the effect that any input will match this tag. However, since this is the lowest priority entry, this tag will match only if no other higher-priority tag matches.

Figure 4:
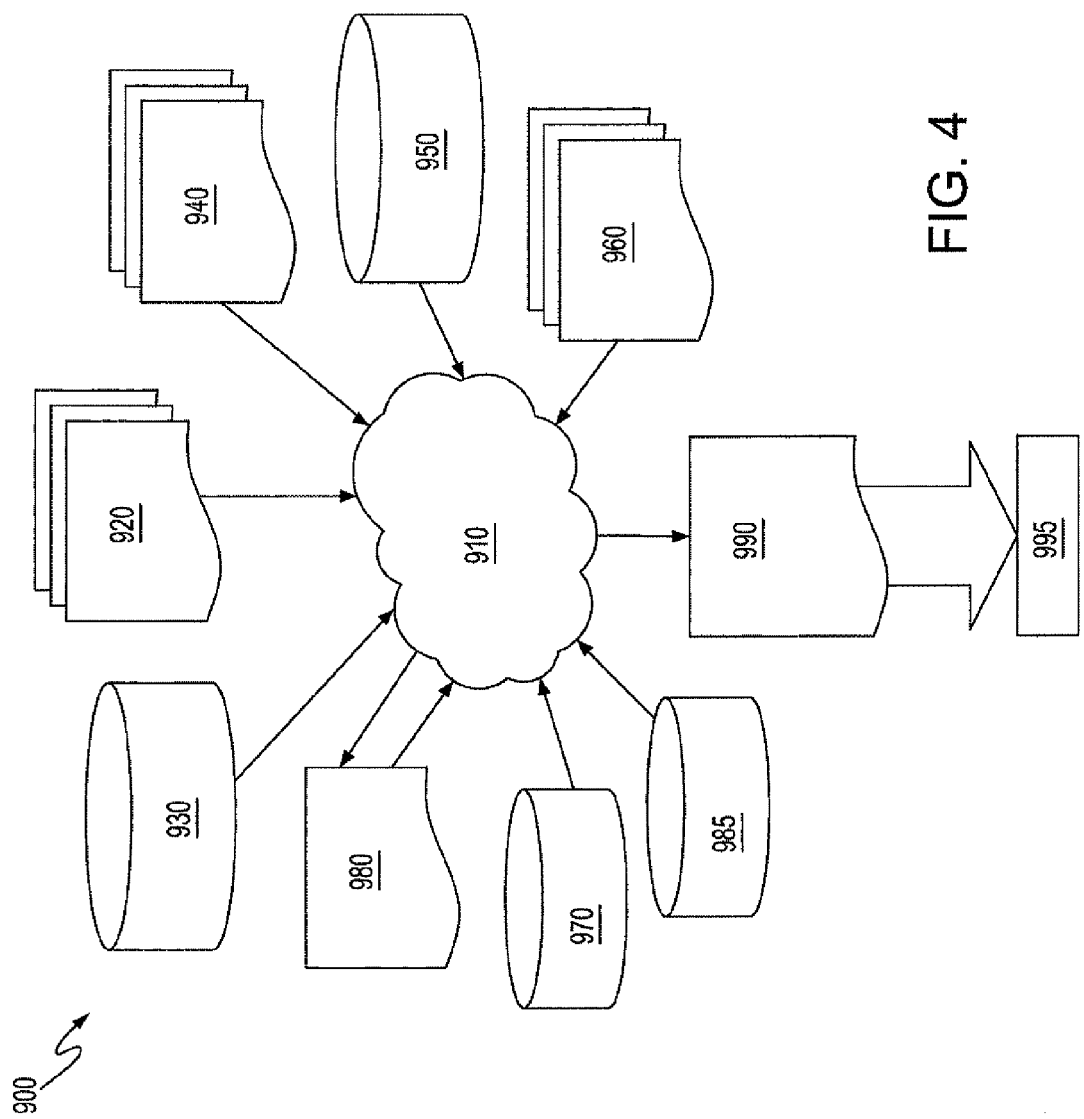
FIG. 4 is a flow diagram of a design process used in semiconductor designing, manufacture and/or testing.

FIG. 4 shows a block diagram of an exemplary design flow 900 used for example, in semiconductor design, manufacturing, and/or test. Design flow 900 may vary depending on the type of IC being designed. For example, a design flow 900 for building an application specific IC (ASIC) may differ from a design flow 900 for designing a standard component or from a design from 900 for instantiating the design into a programmable array, for example a programmable gate array (PGA) or a field programmable gate array (FPGA) offered by Altera® Inc. or Xilinx® Inc. Design structure 920 is preferably an input to a design process 910 and may come from an IP provider, a core developer, or other design company or may be generated by the operator of the design flow, or from other sources. Design structure 920 comprises an embodiment of the invention as shown in FIGS. 1-3B in the form of schematics or HDL, a hardware-description language (e.g., Verilog, VHDL, C, etc.). Design structure 920 may be contained on one or more machine readable medium. For example, design structure 920 may be a text file or a graphical representation of an embodiment of the invention as shown in FIGS. 1-3B. Design process 910 preferably synthesizes (or translates) an embodiment of the invention as shown in FIGS. 1-3B into a netlist 980, where netlist 980 is, for example, a list of wires, transistors, logic gates, control circuits, I/O, models, etc. that describes the connections to other elements and circuits in an integrated circuit design and recorded on at least one of machine readable medium. For example, the medium may be a CD, a compact flash, other flash memory, a packet of data to be sent via the Internet, or other networking suitable means. The synthesis may be an iterative process in which netlist 980 is resynthesized one or more times depending on design specifications and parameters for the circuit.

Design process 910 may include using a variety of inputs; for example, inputs from library elements 930 which may house a set of commonly used elements, circuits, and devices, including models, layouts, and symbolic representations, for a given manufacturing technology (e.g., different technology nodes, 32 nm, 45 nm, 90 nm, etc.), design specifications 940, characterization data 950, verification data 960, design rules 970, and test data files 985 (which may include test patterns and other testing information). Design process 910 may further include, for example, standard circuit design processes such as timing analysis, verification, design rule checking, place and route operations, etc. One of ordinary skill in the art of integrated circuit design can appreciate the extent of possible electronic design automation tools and applications used in design process 910 without deviating from the scope and spirit of the invention. The design structure of the invention is not limited to any specific design flow.

Design process 910 preferably translates an embodiment of the invention as shown in FIGS. 1-3B, along with any additional integrated circuit design or data (if applicable), into a second design structure 990. Design structure 990 resides on a storage medium in a data format used for the exchange of layout data of integrated circuits and/or symbolic data format (e.g. information stored in a GDSII (GDS2), GL1, OASIS, map files, or any other suitable format for storing such design structures). Design structure 990 may comprise information such as, for example, symbolic data, map files, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1-3B. Design structure 990 may then proceed to a stage 995 where, for example, design structure 990: proceeds to tape-out, is released to manufacturing, is released to a mask house, is sent to another design house, is sent back to the customer, etc.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A design structure including universal peripheral processor architecture embodied in a non-transitory machine readable storage medium for data storage or transmission for designing, manufacturing, or testing an integrated circuit (IC), the design structure comprising:
a first data bus and a second data bus wherein the first and second data buses are coupled to a TCAM (ternary content addressable memory) providing communication between the first and second data buses, the TCAM is part of a finite state machine;
a processor for managing control functions on the IC being coupled to the TCAM, the TCAM interfacing with the processor using at least one predefined signaling protocol, the TCAM using pattern matching to match a particular state of one or more signals for communicating state information to the processor using a hardware branch vector, the hardware branch vector communicating and receiving an execution thread from the processor, the hardware branch vector defining a point at which the processor acts on a current state of the finite state machine;
a data path enabling transfer of data between the first and second data buses, wherein the data path also communicates with a data storage device;
a data control path enabling communication between and coupled to the data storage device, the processor, and the TCAM, and the processor using the TCAM for determining next processor operations; and
a non-transitory machine readable storage medium for data storage or transmission embodying the features above in a design structure.

2. The design structure of claim 1, wherein the data storage device includes a FIFO device, the FIFO device communicating status to the TCAM, and the TCAM communicating a state of each of the first and second data buses to a register in the processor.

3. The design structure of claim 1, further comprising first and second processors coupled to a first TCAM and a second TCAM; and
comprising first and second data storage devices both communicating with the data path.

4. The design structure of claim 1, wherein the design structure comprises a netlist residing on a non-transitory medium.

5. The design structure of claim 1, wherein the design structure resides on the non-transitory machine readable storage medium.

6. The design structure of claim 1, wherein the design structure resides on a programmable gate array.

7. A design structure including universal peripheral processor architecture embodied in a non-transitory machine readable storage medium for data storage or transmission for designing, manufacturing, or testing an integrated circuit (IC), the design structure comprising:
a first data bus and a second data bus wherein the first data bus is coupled to a first TCAM interface logic device configured as a state machine and the second data bus is coupled to a second TCAM interface logic device configured as a state machine, wherein the first and second TCAM interface logic devices provide communication between the first and second data buses including enabling interface of multiple signaling protocols, each of the TCAM interface logic devices being part of finite state machines;
a processor for managing control functions on the IC being coupled to the first TCAM interface logic device and the second TCAM interface logic device by a data path, wherein the data path communicates with a first data storage device coupled to a second data storage device, each of the TCAM interface logic devices using pattern matching to match a particular state of one or more signals for communicating state information to the processor using a hardware branch vector, the hardware branch vector communicating and receiving an execution thread from the processor, the hardware branch vector defining a point at which the processor acts on a current state of the state machine;
a data control path enabling communication between and coupled to the first and second data storage devices, the processor, and the first and second TCAM interface logic devices, and the first and second TCAM interface logic devices interfacing between the processor using a predefined protocol, and the first and second processors using the first and second TCAM interface logic devices, respectively, for determining next processor operations; and a non-transitory machine readable storage medium for data storage or transmission embodying the features above in a design structure.

8. The design structure of claim 7, further including a plurality of TCAMs communicating with each other and a plurality of processors.

9. The design structure of claim 7, including a plurality of FIFOs communicating with the first and second data buses, the FIFO devices communicating status to the TCAM interface logic devices, and the TCAM interface logic devices communicating a state of each of the first and second data buses to a register in the processor.

10. The design structure of claim 7, further including at least two clock domains and a plurality of meta-stability devices communicating with the processors to provide interface between the clock domains and the processors.

11. The design structure of claim 7, wherein the design structure comprises a netlist residing on a non-transitory medium, and wherein the design structure resides as a layout of an integrated circuit.

12. The design structure of claim 7, wherein the design structure resides on a programmable gate array.

13. A design structure including universal peripheral processor architecture embodied in a non-transitory machine readable storage medium for data storage or transmission for designing, manufacturing, or testing an integrated circuit (IC), the design structure comprising:

a first data bus and a second data bus communicating with a first ternary content addressable memory (first TCAM) interface logic device and a second ternary content addressable memory (second TCAM) interface logic device, wherein the first and second TCAMs provide communication between the first and second data buses including enabling interface of multiple signaling protocols, each of the TCAMs being part of finite state machines;

a first processor for managing control functions on the IC being coupled to the first TCAM, and a second processor for managing control functions on the IC being coupled to the second TCAM, each of the TCAMs using pattern matching to match a particular state of one or more signals for communicating state information to the processor using a hardware branch vector, the hardware branch vector communicating and receiving an execution thread from the processor, the hardware branch vector defining a point at which the processor acts on a current state of one of the finite state machines;

a first data storage device communicating with the first processor and a second data storage device communicating with the second processor, both the first and the second data storage devices coupled to the first data bus and the second data bus and communicating with each other;

a data control path enabling communication between and being coupled to the first and second data storage devices, the first and second processors, and the first and second TCAMs;

the first TCAM configured as a state machine and coupled to the first data storage device, the first TCAM interfacing between the first processor and the first data bus using a first predefined protocol;

the second TCAM configured as a state machine and coupled to the second data storage device, the second TCAM interfacing between the second processor and the second data bus using a second predefined protocol; and a non-transitory machine readable storage medium for data storage or transmission embodying the features above in a design structure, wherein the first and second processors receive data from the first and second TCAMs, respectively, and the first and second processors each determine a next processor operation in the first and second processors using the data received from the first and second TCAMs.

14. The design structure of claim 13, wherein the first data bus and first TCAM are in a first clock domain and the second data bus and the second TCAM are in a second clock domain, and at least one meta-stability device communicates with and provides interface between the first and second data buses and the first and second processors.

15. The design structure of claim 13, wherein the first and second data storage devices include first and second FIFO devices, respectively, the FIFO devices communicate status to the first and second TCAMs, and the first and second TCAMs communicates a state of each of the first and second data buses to a register in the processor.

16. The design structure of claim 13, further including first and second transformers to provide data transformation between the first and second data buses, respectively, wherein the first and second transformers communicate with the first and second data storage devices, respectively, via a plurality of data paths and communicate with the first and second processors, respectively, via a plurality of control paths.

17. The design structure of claim 13, wherein the first and second data buses communicate with each other and the first and second storage devices via a plurality of data paths.

18. The design structure of claim 13, wherein the design structure comprises a netlist residing on a non-transitory medium.

19. The design structure of claim 13, wherein the design structure resides as a layout of an integrated circuit.

20. The design structure of claim 13, wherein the design structure resides on a programmable gate array.

21. The design structure of claim 1, further comprising:
a data branch for receiving output signals from the TCAM being received by the processor for determining the next processor operations.

22. The design structure of claim 1, further comprising:
a data branch for receiving a plurality of output signals from the TCAM being received by the processor for determining the next processor operations, the output signals including one or more of the following: next state data, a drive signal from the first or second bus, and a control signal from the data storage device.

23. The design structure of claim 1, further comprising:
a data branch for receiving output signals from the TCAM being received by the processor for determining the next processor operations; and
another data branch for providing input signals to the TCAM including one or more of the following: a plurality of output signals from the processor, and a plurality of signals from a control portion of the first or the second data buses.

24. The design structure of claim 1, further comprising:
a data branch for receiving output signals from the TCAM being received by the processor for determining the next processor operation; and
another data branch for providing input signals to the TCAM including one or more of the following: a plurality of output signals from the processor, a plurality of signals from a control portion of the first or the second data buses, and a plurality of signals representing a current state of a finite state machine.

25. The design structure of claim 1, wherein the number of branches in the state machine is equal to the number of TCAM entries, and a default trap state is programmed into the TCAM such that an input which does not match any valid state will match a tag of the trap state.

* * * * *